May 21, 1963   L. J. SPICKARD   3,090,202
IRRIGATION GATE WALL
Filed Jan. 28, 1960   4 Sheets-Sheet 2

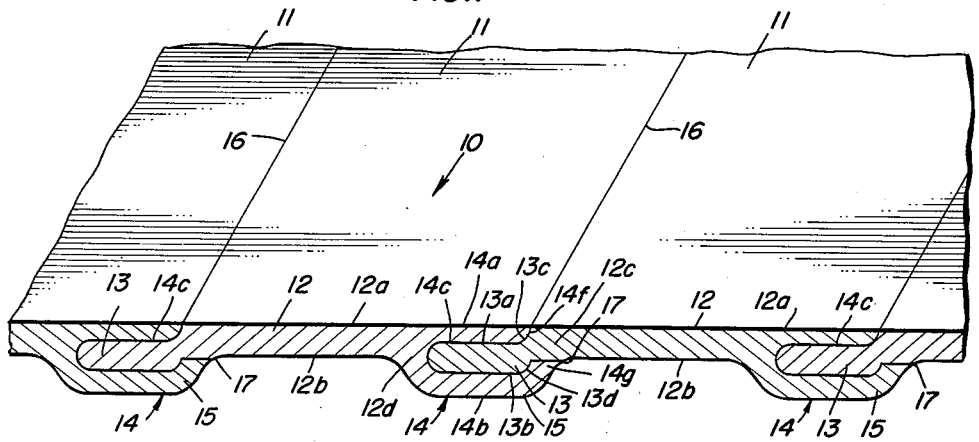
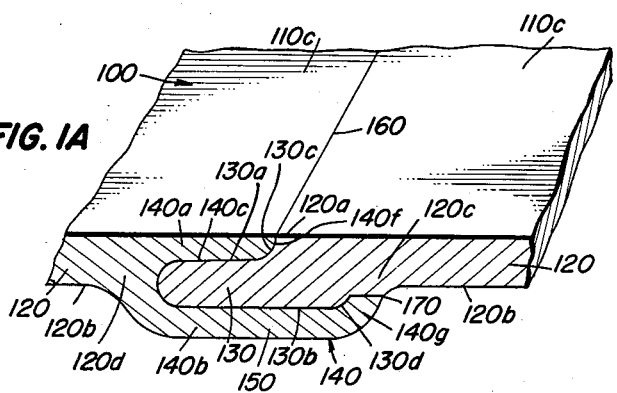
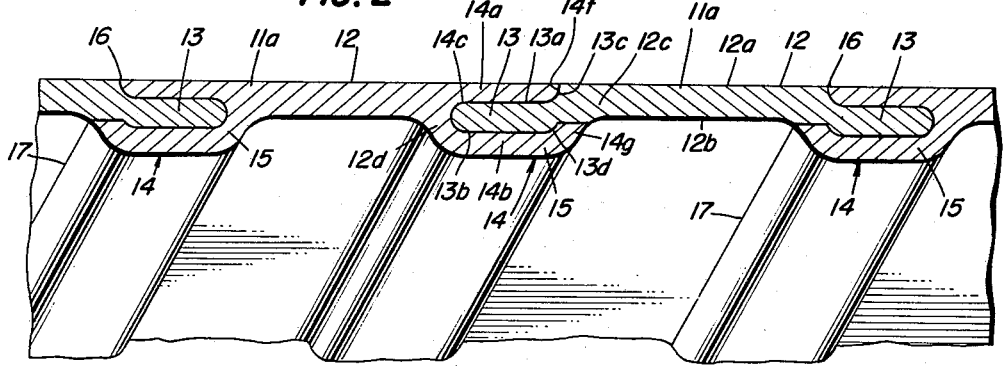

INVENTOR.
Lawrence J. Spickard
BY
ATTORNEY

May 21, 1963
L. J. SPICKARD
3,090,202
IRRIGATION GATE WALL
Filed Jan. 28, 1960
4 Sheets-Sheet 3
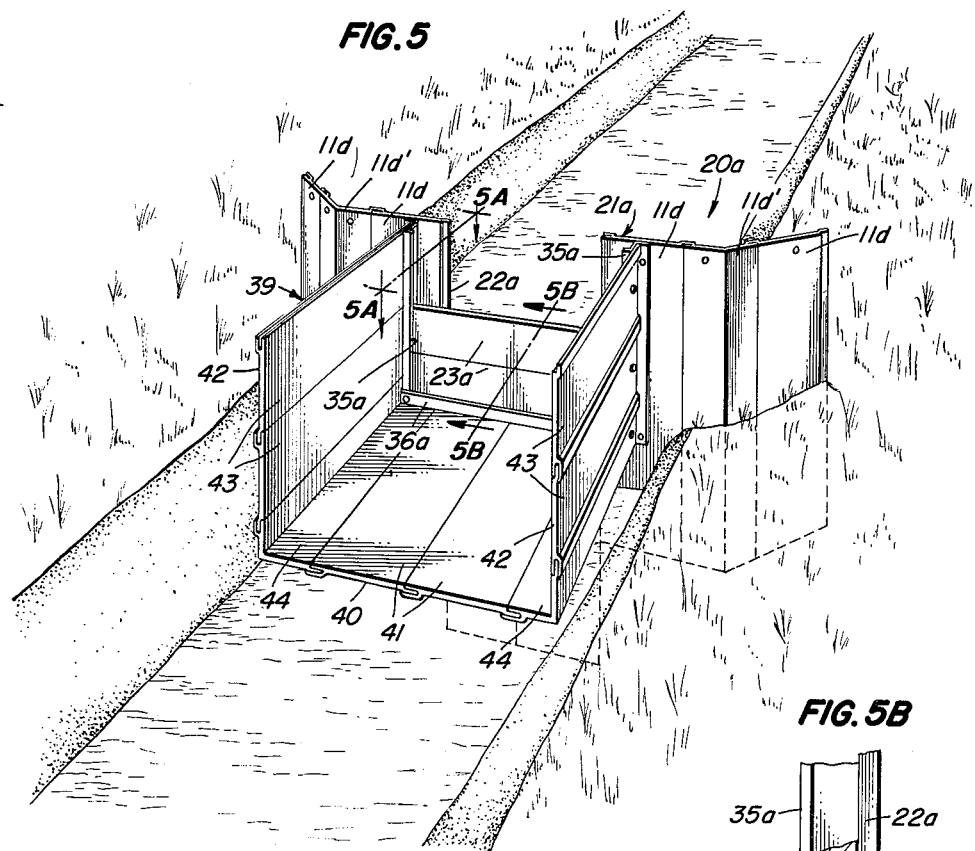
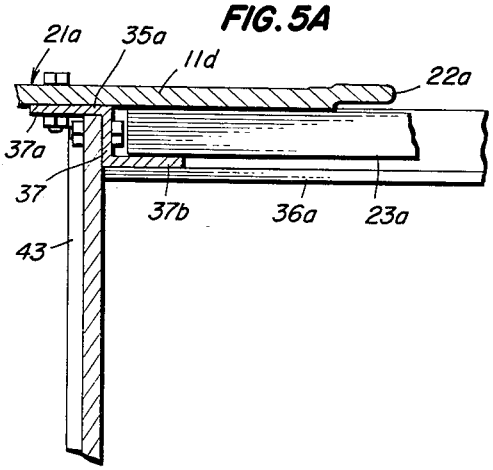
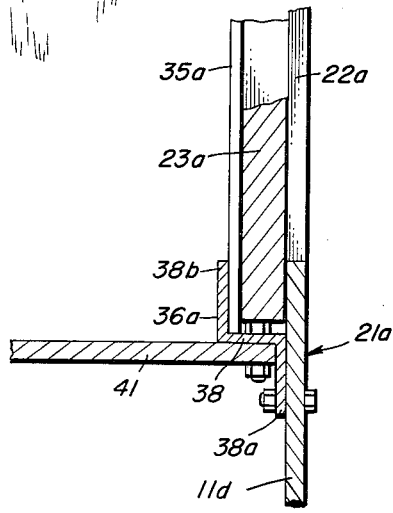
INVENTOR.
Lawrence J. Spickard
BY
ATTORNEY May 21, 1963 L. J. SPICKARD 3,090,202
IRRIGATION GATE WALL
Filed Jan. 28, 1960 4 Sheets-Sheet 4
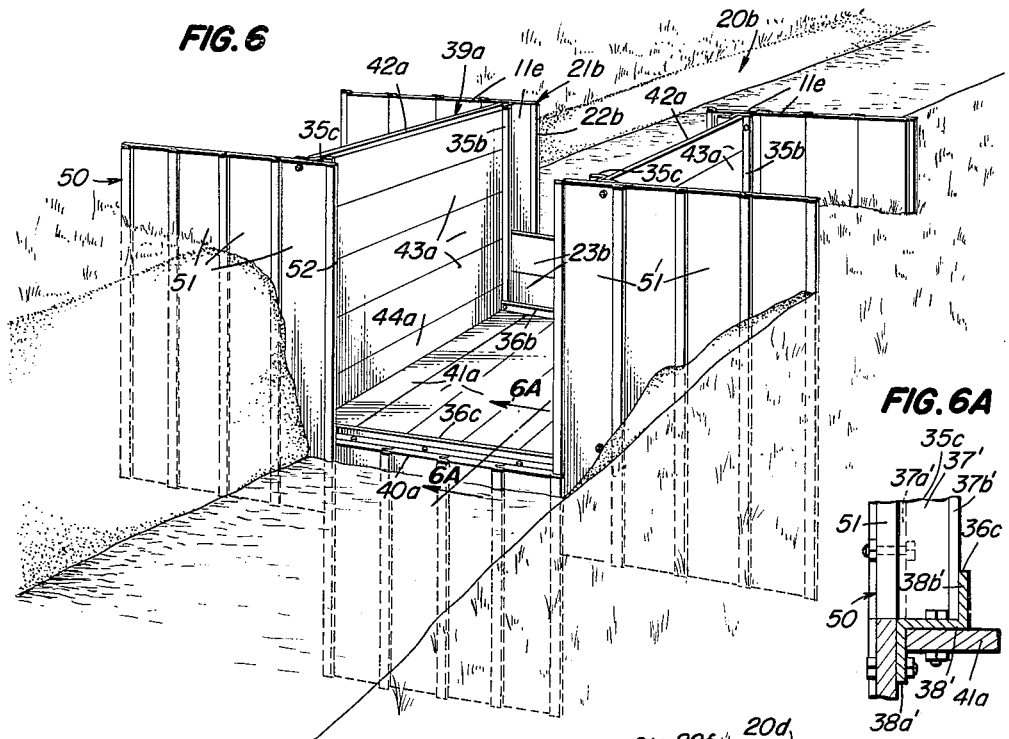
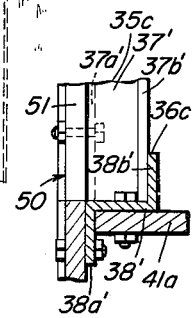
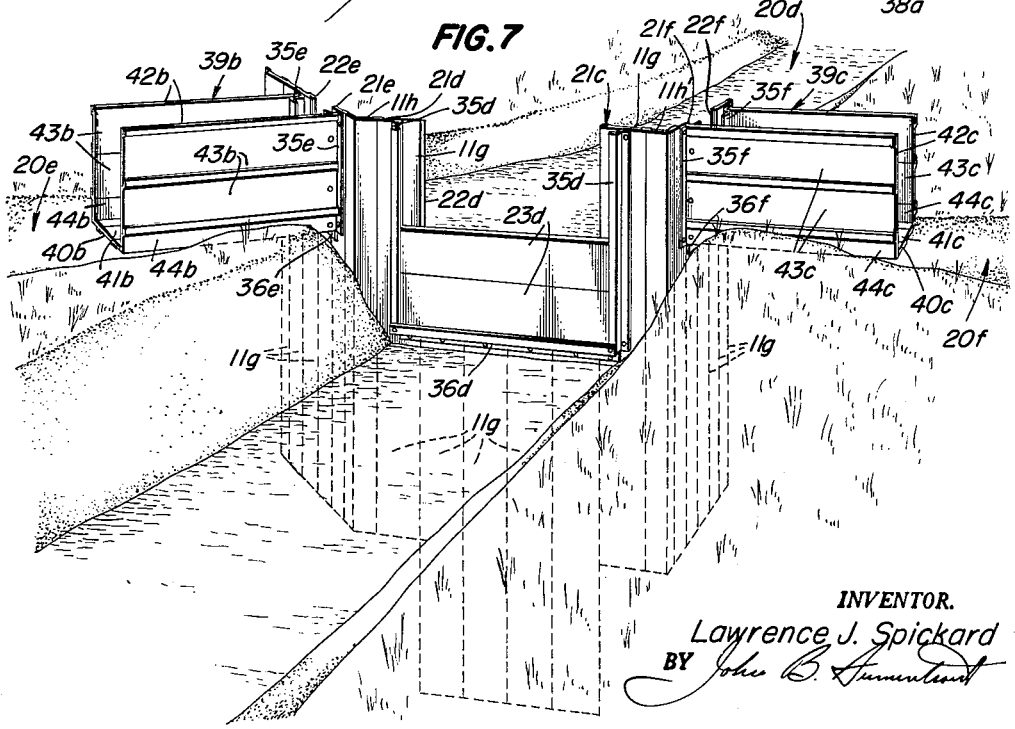
INVENTOR.
Lawrence J. Spickard
BY
ATTORNEY United States Patent Office 3,090,202
Patented May 21, 1963

3,090,202
IRRIGATION GATE WALL
Lawrence J. Spickard, 721 11th St., Clarkston, Wash.
Filed Jan. 28, 1960, Ser. No. 5,265
5 Claims. (Cl. 61—28)

This invention relates to plank assemblies and more specifically to irrigation gates including the plank assemblies for controlling the flow of water in irrigation ditches, and this application is a continuation-in-part of my pending application Serial No. 536,646, filed September 26, 1955, and now abandoned.

An object of this invention is the provision of an irrigation gate wall which can be readily assembled from a plurality of interconnecting planks, and which when assembled affords a strong, durable wall having a water passage therethrough which is framed by gate member support components so that the amount of water flowing through the passage can be varied by removing or inserting one or more gate members.

Another object of the present invention is to frame the water passage in an irrigation gate wall assembly with support components which are adapted to support removable gate members for controlling the flow of water through the passage, and which are further adapted to support a trough assembly which prevents water flowing through the passage from undercutting the bed of the irrigation ditch on the downstream side of the wall.

A further object of this invention is the provision of an irrigation gate wall assembly which is adapted to control the flow of water in two irrigation ditches which intersect each other at an angle, and which is further adapted to prevent the erosion of soil between the two ditches by water flowing from one of the ditches to the other.

Another object of this invention is to provide an irrigation gate wall which can readily be assembled for extended use in one location, but which can be disassembled and reassembled in another location when desired.

A further object of the present invention is the provision of an irrigation gate wall which is assembled from a plurality of tongue and groove planks which are sturdy and can be driven into the earth one at a time without splitting or splintering and which planks when assembled afford a substantially water tight wall having a smooth downstream surface to which highly satisfactory and easily attached support components can seat so that when the gate members are in place across the water passage in the wall, the flow of water is effectively arrested by the wall, the support components and the gate members.

Other objects of this invention in part will be obvious and in part pointed out more fully hereinafter.

The invention accordingly consists in the features and combinations of components, and the relation of same to one another as described herein, the scope of the application of which is indicated by the following claims.

In the accompanying drawing representing several embodiments of the present invention:

FIGURE 1 is an isometric end view of a plank assembly;

FIGURE 1A is an isometric end view of a modified plank assembly;

FIGURE 2 is an isometric end view of another modified plank assembly;

FIGURE 5 represents in perspective view a form of water irrigation gate wall with gate and a downstream trough;

FIGURE 5A is a section taken along line 5A—5A of the structure in FIGURE 5;

FIGURE 5B is a section taken along line 5B—5B in FIGURE 5;

FIGURE 6 represents in perspective view of a water irrigation wall with gate, downstream trough and a downstream wall associated with the trough;

FIGURE 6A is a section taken along line 6A—6A of FIGURE 6; and

FIGURE 7 is a perspective view of a plank assembly serving as an irrigation gate wall for a plurality of intersecting irrigation ditches.

Figure 3:
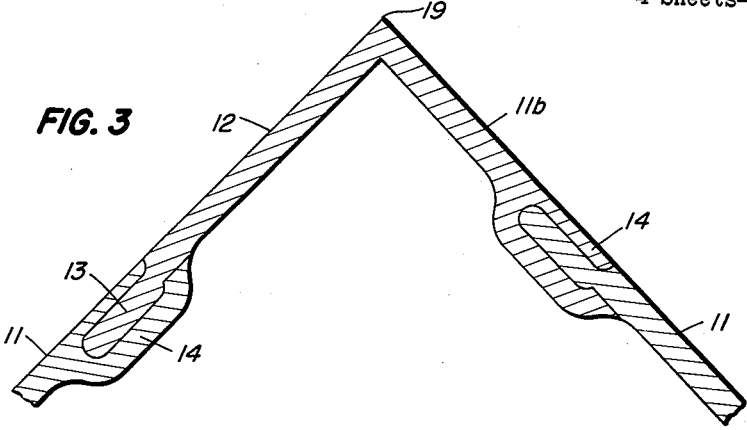
FIGURE 3 is a transverse detail sectional view of an angular plank in assembly with other planks in a wall.

As conducive to a clearer understanding of certain features of the present invention it may be noted at this point that many of the irrigation gate walls heretofore known for controlling the flow of the water in irrigation ditches have lacked such features as strength, and only too frequently, in order to overcome this disadvantage, an objectionable increase in bulk and weight of structure must be tolerated. Then, too, many of the irrigation ditch walls employed in the prior art are not readily transported to the point where installation is to be achieved. Other difficulties too have been experienced through the fact that the components available for constructing the wall are not of a kind which can be readily assembled and combined with a control gate for impounding the water and controlling the water level in the ditch. Often when the wall is made of planks, the planks are difficult to drive in proper relation to each other and share no interlock against spreading apart, thus permitting leaks and perhaps the full escape of one or more of the planks from the remainder of the structure when the structure is under load of the water which it impounds in the ditch.

It is accordingly an outstanding object of this invention to provide an irrigation assembly which in having a wall and gate is easy to install and affords features of interlock of the wall planks, water tightness and strength and durability, the gate in the wall further being very effectively correlated with the remainder of the structure to facilitate installation and give good service, and which assembly moreover can be disassembled for further use in another location.

Referring now more particularly to FIGURE 1 of the drawing, it will be seen that a plank assembly designated in general by reference numeral 10 includes a plurality of planks 11 having webs 12 of the same width from plank to plank or if desired the planks may be of various widths across their webs. Preferably, the planks are of metal such as low carbon steel, or aluminum, but in certain instances strong, rigid, materials other than metal, for example hard synthetic resin such as phenol-formaldehyde resin or hard rubber may be substituted as the plank material. The planks 11 form joints with each other along their webs 12 and for this purpose the webs of adjacent planks respectively afford joint-forming components including integral tongues 13 and integral groove-defining portions 14, all of which components extend continuously lengthwise of the planks and engage each other by interlock which is achieved by advancing the planks lengthwise after engaging a tongue 13 on one of the planks in the groove 14c of a groove-defining portion 14 on the adjacent plank. In the plank assembly, the components of the joints formed by the planks are substantially parallel to each other. The resulting joints include spaced ribs 15 extending substantially parallel to each other longitudinally of the planks in the assembly. Each rib 15 stands out from the one side of the adjacent plank webs 12. The immediately opposite faces 12a of the planks are flat and flush with respect to each other. Each rib houses one of the tongues 13 having a side 13a indented from side 12a of the corresponding web 12, the indent affording an inset heel 13c, and the tongue having an opposite side 13b set out from the side 12b of the corresponding plank web, producing an outset heel 13d. The tongue 13 is covered by portion 14 on the adjacent plank and slidably fits the groove 14c to within close tolerances. The groove-defining portion 14 is bifurcated, having legs 14a and 14b on opposite sides of the groove 14c and merging at the base of the groove with the corresponding web 12. Leg 14a has an outer end 14f substantially in abutment with the inset heel 13c. Leg 14b is raised from its corresponding web 12, passes over side 13b of the tongue and has an inturned end 14g substantially abutting the surface of the adjacent plank behind heel 13d and forming longitudinal seam 17 with the latter plank. The heel 13d and inturned end 14g form an interlock preventing separation of the tongue 13 and groove-defining portion 14 laterally of the planks, yet the planks may be assembled and disassembled by relative longitudinal sliding movement of the planks. Tongues 13 advantageously are substantially rectangular in cross section taken transversely of the planks, and have for strength and other important reasons about the same thickness as the corresponding plank web 12, are set in from surface 12a of this web by about half the web thickness and are set out from surface 12b of the web by about half the web thickness.

The outer end of leg 14b advantageously forms the longitudinal seam 17 with a thickened portion 12c of the web 12 of the adjacent plank, for in this manner the tongue 13 may have a thicker cross section where integrally merging with the web, all consistent with maximum strength for minimum quantity of material in the planks. Likewise, web 12 in being integral with leg 14b, advantageously is thickened at 12d. The outside contour of each rib 15 and the related joint preferably is substantially trapezoidal when viewed in transverse section of the planks, each rib having sides sloping laterally and inwardly toward the adjacent plank webs from the thickest portions of the related joint.

As represented in FIGURE 1, each plank 11 has a tongue 13 integral with its web 12 at one longitudinal edge and a groove-defining portion 14 integral with the web 12 at its other longitudinal edge, the groove being substantially parallel to the tongue. It will be appreciated, however, that in certain instances (see FIGURE 2) that planks 11a are provided, and some of the webs 12 of which may have only spaced tongues 13 for opposite longitudinal marginal edges integral with the web and disposed parallel with respect to each other, while others of the webs 12 may have only groove-forming portions 14 for opposite longitudinal marginal edges integral with the corresponding web, the grooves so formed being substantially parallel to each other.

There are occasions, too, where (see FIGURE 3) the plank assemblies include one or more planks 11b of angular transverse cross section wherein an apex 19 of the angle used is in the web 12 of the plank and runs longitudinally of the plank. The angular plank represented for example has a tongue 13 and a groove-defining portion 14 integral with the web on opposite sides of the apex 19. If desired, the angular planks may have tongue or groove-defining portions on both sides of the apex consistent with the modification represented in FIGURE 2.

Figure 4:
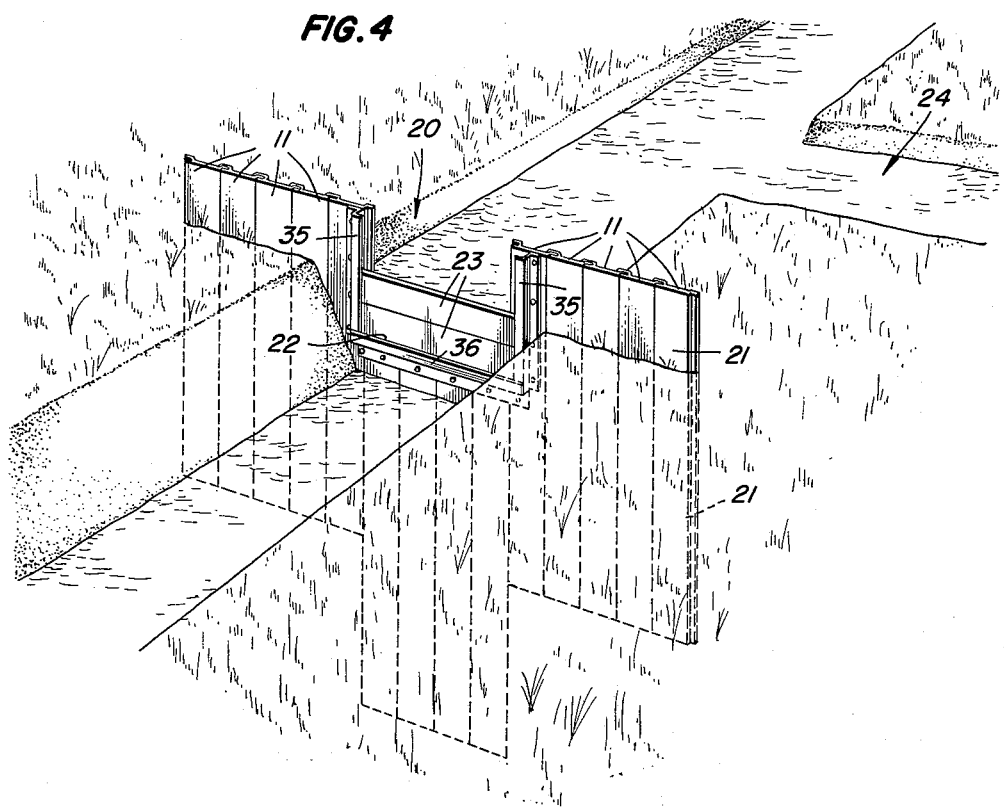
FIGURE 4 represents in perspective view a plank assembly with gate in a water irrigation system.

Planks of the character described are driven longitudinally into the earth, such as across the main earthen channel 20 and into the earthen banks of an irrigation system (see FIGURE 4) to provide an irrigation gate wall 21, each plank in turn is driven down substantially to the final position. Where each plank has a tongue 13 and a groove-defining portion 14 consistent with the embodiment represented in FIGURE 1, it is entirely possible to drive the planks one at a time without having any substantial amount of dirt enter the grooves 14c which are to receive the tongues. By driving the planks and working to the tongue of the last driven plank, the groove-defining portion 14 of the plank then being driven enters the earth after being engaged with the tongue above grade, and in passing into the earth, groove 14c is filled by the snug fitting tongue 13 of the plank last driven. During the driving, the plank being driven is interlocked laterally with the plank already driven, thus by virtue of the interlocking tongue and groove-forming portions of the planks. In those instances where driving practices are utilized which introduce filling of the grooves 14c below grade with dirt, the snug fitting tongue 13 of the next plank driven is effective to push the dirt from the groove during the driving operation, which function is encountered for example in driving planks, alternately having all tongues 13 and all groove-defining portions 14.

In producing an irrigation control gate wall 21, the planks 11 advantageously are long enough to penetrate below grade an amount sufficient to protect against undercutting by the water and otherwise impound the water which is to be controlled. Likewise, the width of the assembly represented by the collective planks is readily made great enough to prevent flow of water around the sides of the assembly. At least one of the planks 11, in the path of the earthen canal 20 is driven into the earth so that its crest line is below the crest line of the planks on the opposite flanks, accordingly to outline a passage 22 having the lower crest line for bottom and adjacent edges of the adjacent planks for sides. It will be noted that the planks 11 in the wall preferably have the plane faces 12a on the downstream side of the irrigation wall. The wall accordingly has a substantially flat downstream side area adjacent to the passage 22, including the substantially continuous coplanar areas 12a of the planks which are at the sides and bottom of the passage 22. The passage may be adjusted in effective height by one or more gate members 23 slidably supported to the planks, preferably in a manner described more fully hereinafter. Adjacent the side edges of passage 22 are gate member end guide components in the form of Z-members 35 having a web and a pair of substantially parallel spaced apart legs extending from the web. One of the legs of each guide component is bolted or otherwise connected to irrigation wall 21 and alone, or with the aid of a seal, conform to the flat faces 12a of the planks which it abuts to arrest leakage of water. The other leg is substantially parallel to and spaced from the adjacent plane surface of the wall provided by the flat faces 12a of the planks and extends toward passage 22. The Z-members 35 and wall 21 thus afford parallel vertical guide paths for the ends of gate members 23. Those planks 11 at the bottom of passage 22 support a gate bottom rest component adjacent their crest lines, this preferably being a Z-member 36 having one of its legs sealingly on faces 12a of the adjacent planks and bolted or otherwise secured to the gate wall 21 adjacent the bottom edge of passage 22 while the other leg is spaced from the adjacent plane surface of wall 21, producing an upwardly open groove to stop the bottom of the gate. Member 23 of the gate is inserted under the guidance of members 35 and thereafter by slidably adding members 23, behind the guide members 35, or by removing members 23, the effective height of water in the irrigation canal may be controlled. The Z-members 35 and 36 of the gate bottom and end support have portions which conform to the end and bottom areas of the gate for arresting leakage past the gate when the passage is closed by the gate. The web of Z-member 36 thus for example conveniently conforms to the bottom edge of lowermost member 23 of the gate while the inside surfaces of the outer legs of Z-members 35 conform to the adjacent end areas of the gate. It thus will be seen that the irrigation gate wall is installed simply by assembling a plurality of individual members which are easy to transport and handle. The irrigation wall need not necessarily be regarded as permanent, but may be knocked down and removed piece by piece for use somewhere else if desired.

The joints achieved between the planks not only are characterized by having their grooves substantially filled by tongues, thus contributing to rigidity and strength of the assemblies achieved when the assemblies are under load such as water load, but the joints resist the escape of liquids through them. Moreover, the tongue and groove-forming portions of the planks interlock the planks in the wall in series and against separation widthwise of the wall. The tongue and groove-forming components of the joints bind under small deflections which retain the gate member or members 23. This is enhanced by having the leg surfaces of components 35 and 36 also flat where the leg surfaces bear against the planks 11 and are pressed against the planks by the bolts employed.

Referring more particularly to the embodiment illustrated in FIGURE 5 of the drawing, an irrigation ditch 20a is provided with a gate wall 21a constructed from a plurality of planks 11d and angle members 11d'. Planks 11d and angle members 11d' preferably have interlocking side edges of the character illustrated in FIGURES 1 or 2. Gate wall 21a is similar in construction to gate wall 21 illustrated in FIGURE 4, and in this respect is provided with a water passage 22a, a removable gate having one or more members 23a, guide components 35a, and a bottom support component 36a; however, in this instance, gate wall 21a is provided with a splash trough 39 which is comprised of a bottom 40 and a pair of side walls 42. In addition to providing support for gate members 23a, guide components 35a and bottom component 36a serve to support the upstream end of the trough 39. Guide components 35a are preferably Z-members having a web portion 37 which interconnects legs 37a and 37b of the guide components (see FIGURE 5A). The bottom component 36a is preferably also a Z-member, having a web portion 38 extending downstream from leg 38a which is secured to gate wall 21a, as illustrated in FIGURE 5B. Leg 38b of bottom component 36a extends upwardly from web 38 to define a groove with gate wall 21a for receiving the bottom edge of a gate member 23a. Each side wall 42 of trough 39 is adapted to be secured to the web portion 37 of the corresponding guide component 35a such as by bolts threadedly engaged with nuts, and bottom wall 40 of trough 39 is adapted to be secured to web 38 of bottom support component 36a, also such as by bolts and corresponding nuts, to provide lateral support for the bottom wall. Bottom 40 of trough 39 is above or in proximity to the bed of the irrigation ditch on the downstream side of gate wall 21a and serves to prevent water passing through passage 22a and pouring down from the crest of the gate in wall 21a from undercutting the ditch bed immediately in front of the gate wall in the downstream direction. The side walls 42 of splash trough 39 also shield the earthen ditch in the immediate vicinity of the wall. Bottom 40 is constructed from a plurality of planks 41, and side walls 42 are constructed from a plurality of planks 43. The side walls 42 are interconnected with bottom wall 40 by angle plank members 44. Planks 41 and 43 and angle plank members 44 preferably have interlocking side edges and illustratively are of the character illustrated in FIGURES 1 and 3, in order to reduce the leakage of water between planks and between the angle members and adjacent planks and promote lateral strength of the trough. The smooth sides of the planks preferably face inwardly of the trough so that the upstream ends of the side walls and bottom wall of the trough are flush with the outside surfaces of the Z-members to reduce leakage of water between the Z-members and trough.

With reference to FIGURE 6, an earthen channel 20b is provided with a gate wall assembly 21b, similar to the assembly 21a illustrated in FIGURE 5. Gate wall assembly 21b is provided with a second wall 50 of planks downstream from gate wall 21b for supporting the downstream end of a trough 39a. The upstream wall 21b is comprised of a plurality of planks 11e which are constructed and assembled in the manner described hereinbefore to provide a water passage 22b. The downstream side of the gate opening 22b is framed by gate end guide components 35b and a gate bottom rest component 36b to provide a support for one or more removable gate members 23b, and to support the upstream end of trough 39a. Downstream wall 50 is constructed from a plurality of laterally interlocking tongue and groove planks 51 of the type hereinbefore described, which planks are assembled so that smooth, coplanar surfaces thereof face upstream toward gate wall 21b. Wall 50 is provided with a water passage 52, similar to passage 22b in gate wall 21b, and passage 52 is framed on the upstream side thereof by guide components 35c and a bottom component 36c (see FIGURE 6A). Guide components 35c are preferably Z-members each having a flange portion 37' and legs 37a' and 37b', leg 37a' being secured to the upstream side of wall 50 and adjacent the corresponding side edge of passage 52. Bottom component 36c is preferably a Z-member having a flange portion 38' and legs 38a' and 38b', leg 38a' being secured to the upstream side of wall 50 and adjacent the bottom edge of passage 52. The upsteam end of each side wall 42a of trough 39a is secured to the flange portion of the corresponding guide component 35b on wall 21b in the manner described herein with reference to the upstream ends of side walls 42 of trough 39 illustrated in FIGURE 5. Further, bottom component 36b supports the upstream end of bottom wall 40a in the manner set forth with respect to bottom wall 40 of trough 39 in FIGURE 5. The downstream end of each side wall 42a is secured to the flange portion 37' of the corresponding guide component 35c, and the downstream end of bottom wall 40a is supported with respect to wall 50 by bottom component 36c. Although bottom component 36c is illustrated as being a Z-member, the bottom component may be an angle member having one leg secured to wall 50 and a second leg extending in an upstream direction from the first leg for supporting the downstream end of bottom wall 40a, in which case bottom wall 40a can rest on top of the second leg. If desired the gate 23b may be introduced in the guide components 35c and bear upon the bottom component 36c for closing off the flow of water through both of the walls 21b and 50. The earth between the two walls is effectively shored by the walls, and a strong load resistant wall assembly including the trough accordingly is obtained.

FIGURE 7 represents an irrigation gate wall assembly 21c for controlling the flow of water in a main earthen channel 20d and lateral earthen channels 20e and 20f which intersect main channel 20d at an angle. Gate wall 21c is comprised of a plurality of laterally interlocking tongue and groove planks 11g and angle plank members 11h and 11h'. Angle members 11h and 11h' are interposed between the opposite ends of gate wall 21c and serve to divide gate wall 21c into wall portions 21d, 21e, and 21f which are angularly disposed with respect to each other. Wall portions 21d, 21e, and 21f extend transversely to the direction of water flow in channels 20d, 20e, and 20f respectively, and by interconnecting wall portions 21d, 21e, and 21f by means of the angle members 11h and 11h' (as of the type represented in FIGURE 3) a continuous irrigation gate wall can be constructed for two or more intersecting irrigation ditches. A continuous gate wall of the type illustrated in FIGURE 7 conveniently protects the soil adjacent the intersection of a main ditch and tributary ditches from being cut away by the flow of water from one ditch to the other.

Wall portions 21d, 21e, and 21f of gate wall 21c are provided with passages 22d, 22e, and 22f respectively for the flow of water from the upstream side of the corresponding wall portion to the downstream side thereof, all in the manner of driving the planks to form a wall as hereinbefore described. The bottoms of passages 22c and 22f are higher than the bottom of passage 22d. Further, wall portions 21d, 21e, and 21f are provided with Z-shaped guide components 35d, 35e, and 35f and bottom support components 36d, 36e, and 36f respectively, which guide components and bottom components are secured to the corresponding wall portions in the manner described herein with respect to guide components 35 and bottom components 36 of the gate wall assembly illustrated in FIGURE 4. The guide components and bottom support component associated with each wall portion are adapted to receive one or more removable gate members such as gate members 23d illustrated as being associated with wall portion 21d in FIGURE 7. By introducing a high enough gate across passage 22d, the water level upstream is raised to above the bottom levels of passages 22e and 22f and water will then flow through those passages into channels 20e and 20f unless the gates associated with passages 22e and 22f are closed. A trough may be secured to the guide components and bottom support component on any of the wall portions 21d, 21e, and 21f in the manner hereinbefore described with reference to the gate wall assembly illustrated in FIGURE 5. For purposes of illustration, a trough 39b has been shown in association with wall portion 21e, and a trough 39c with wall portion 21f. It is to be understood that a trough can be secured to the guide components and bottom support of wall portion 21d, and that each trough can be provided with a supporting gate wall on the downstream end thereof, as described herein with reference to the gate wall assembly illustrated in FIGURE 6 of the drawing.

With further regard to the guide components and bottom support components illustrated and described herein as being Z-members, it should be noted that the Z-members are disclosed to illustrate a preferred form of the guide components and bottom support component used to support a gate member with or without a trough with respect to a gate wall. In this and in other possible forms the guide components each have one leg which is adapted to be secured to the gate wall and a second leg which is spaced from the first leg and adapted to provide between the inner surface thereof and the plane of the adjacent surface of the gate wall a guide channel for receiving the marginal side edge of a gate member. The bottom component, though preferably a Z-member, can have any cross sectional configuration which will provide a first leg adapted to be secured to a gate wall, and a second leg which extends outwardly from the first leg for providing lateral support for a gate member or for the bottom wall of a trough.

Although the planks and angle members illustrated in the several embodiments of the gate wall assembly have been described with reference to FIGURES 1, 2, and 3, to illustrate structure of the joint between adjacent planks and angle members of the wall, the planks and angle members in the wall in certain embodiments have joint structure corresponding to the interlocking tongue and groove connection illustrated in FIGURE 1A. FIGURE 1A represents a plank joint which differs from the joint illustrated in FIGURE 1 only insofar as the position of the heel portions are concerned. In this respect, heels 130c and 130d are offset along the tongue with respect to one another. Otherwise, the structure of the joint illustrated in FIGURE 1A corresponds to the joint illustrated in FIGURE 1. More specifically, tongue 130 extends substantially centrally between legs 140a and 140b of the adjacent groove-defining portion 140, and the thickness of the resulting joint where taken through tongue 130 is approximately twice the plank web thickness. Further, the joint thickness diminishes to plank web thickness beyond outset heel 130d and beyond the tip of tongue 130 by a distance laterally of the planks from the tongue or heel amounting substantially to the plank web thickness.

Thus it will be seen that in this invention there are provided irrigation gate wall assemblies wherein the various objects noted herein together with many valuable and highly practical results are successfully achieved. It will be seen that the walls lend themselves to any of a wide variety of possible combinations which include gates for controlling irrigation water and its supply through one or more ditches.

As the invention lends itself to many possible embodiments, and as many possible changes may be made in the embodiments hereinbefore set forth, it will be understood that all matter described herein is to be interpreted as illustrative and not as a limitation.

I claim:

1. An irrigation ditch gate wall for water to be controlled in irrigation, said gate wall comprising a plurality of planks driven vertically into the earth across the irrigation ditch and extending from side to side of the ditch thus forming an irrigation wall, said planks having interlocking tongue and groove-forming portions along their longitudinal edges and said groove-forming portions including longitudinally extending plank ribs, said portions forming joints interconnecting said planks in the irrigation wall continuously in series continuity against widthwise separation after the planks have been driven and said portions maintaining each of said planks, when driven, in interlock with the next of said planks being driven, said planks providing a passage having selected location in the ditch and suited to the ditch, by the top end of at least one intermediate plank of the series of planks being driven down into the ditch and lower than the top ends of adjacent planks of the series flanking said passage in establishing width and vertical extent of said passage, thus for water to flow in the ditch through the pasage from the upstream side to the downstream side of the irrigation wall a surface of said irrigation wall on the side of the wall opposite those of said plank ribs at said intermediate and adjacent planks being a flat surface substantially all in a single plane including corresponding plane faces of said intermediate and adjacent planks, and said gate wall further including a vertically movable gate extending across said passage and along the bottom of said passage to close said passage and to be lifted vertically to open the passage, and gate bottom support and end guide means including a gate bottom rest component extending underneath said passage to support said gate, said gate bottom support and end guide means further including a pair of gate end guide components extending vertically adjacent to opposite sides of said passage to retain the corresponding ends of the gate and guide vertical movement of said gate ends, each of said components having a web and first and second legs extending in opposite directions from opposite ends of said web, said first legs of all of said components being engaged with said irrigation wall and abutting said flat surface of said irrigation gate wall on the far side of said webs of said components from said passage and the first leg of said gate bottom rest component extending across those of said joints formed by said adjacent and intermediate planks under said passage, said second legs of said gate end guide components extending toward each other and being spaced outwardly from said flat surface of said irrigation wall to define therewith spaces slidably receiving the side edges of said gate, and said second leg of said bottom rest component extending upward and being spaced outwardly from said flat surface of said irrigation wall to define therewith a space receiving the bottom edge of said gate, said bottom rest component to receive the bottom of said gate in the space therebetween and upon said web of said bottom rest component.

2. An irrigation ditch gate wall as set forth in claim 1, and further including a trough mounted on said webs of said gate end guide and bottom support components to receive water discharged through said passage, and said trough extending appreciably downstream of said irrigation wall to shield the earth in the ditch immediately downstream of the irrigation wall against being eroded by water flowing through said passage.

3. An irrigation ditch gate wall for water to be controlled in irrigation, said gate wall comprising a plurality of planks driven vertically into the earth across the irrigation ditch and extending from side to side of the ditch thus forming an irrigation wall, said planks having interlocking tongue and groove-forming portions along their longitudinal edges and said groove-forming portions including longitudinally extending plank ribs, said portions forming joints interconnecting said planks in the irrigation wall continuously in series continuity against widthwise separation after the planks have been driven and said portions maintaining each of said planks, when driven, in interlock with the next of said planks being driven, said planks providing a passage having selected location in the ditch and suited to the ditch, by the top end of at least one intermediate plank of the series of planks being driven down into the ditch and lower than the top ends of adjacent planks of the series flanking said passage in establishing width and vertical extent of said passage, thus for water to flow in the ditch through the passage from the upstream side to the downstream side of the irrigation wall, an area of said irrigation wall on the side of said wall opposite those of said plank ribs at said intermediate and adjacent planks being a flat area substantially all in a single plane including corresponding plane faces of said intermediate and adjacent planks, and said gate wall further including a vertically movable gate extending across said passage and along said flat area at the bottom of said passage to close said passage and be lifted vertically to open the passage, and gate guide and stop means engaged with said irrigation wall, including gate edge guide portions in substantially conforming abutting relation to said flat area of said irrigation wall on opposite sides of said passage, said edge guide portions extending outwardly from said flat area of the irrigation wall, and thence laterally toward said pasage to define spaces slidably receiving opposite edges of said gate outside said flat area of the irrigation wall, and said means having area thereon for said gate to abut and be stopped against vertical downward movement relative to said irrigation wall when the gate is in the passage closing position.

4. An irrigation ditch gate wall as set forth in claim 3, and further including a trough mounted on said gate edge guide portions to receive water discharged through said passage, the body of said trough being formed of planks respectively having angular cross section and substantially straight cross section, and said planks of the trough having interlocking tongue and groove-forming portions along their longitudinal edges interlocking said trough planks against widthwise separation from each other.

5. An irrigation ditch gate wall for water to be controlled in irrigation, said gate wall comprising a plurality of planks driven vertically into the earth across the irrigation ditch and extending from side to side of the ditch thus forming an irrigation wall, said planks having interlocking tongue and groove-forming portions along their longitudinal edges and said groove-forming portions including longitudinally extending plank ribs, said portions forming joints interconecting said planks in the irrigation wall continuously in series continuity against widthwise separation after the planks have been driven and said portions maintaining each of said planks, when driven in interlock with the next of said planks being driven, said planks providing a passage having selected location in the ditch and suited to the ditch, by the top end of at least one intermediate plank of the series of planks being driven down into the ditch and lower than the top ends of adjacent planks of the series flanking said passage in establishing width and vertical extent of said passage, thus for water to flow in the ditch through the passage from the upstream side to the downstream side of the irrigation wall, an area of said irrigation wall on the side of said wall opposite those of said plank ribs at said intermediate and adjacent planks being a flat area substantially all in a single plane including corresponding plane faces of said intermediate and adjacent planks, and said gate wall further including a vertically movable gate extending across said passage and along the bottom of said passage to close said passage and be lifted vertically to open the passage, and gate bottom support and end guide means engaged with said irrigation wall, said means including side portions in substantially conforming abutting relation to said flat area of said irrigation wall on opposite sides of said passage, said side portions extending outwardly from said flat area of the irrigation wall, and thence laterally toward said passage to define spaces slidably receiving the side edges of said gate outside said flat area of the irrigation wall, and said means further including a gate bottom rest portion in a substantially conforming abutting relation to said flat area of the irrigation wall under the passage and extending outwardly from said flat area of the irrigation wall and across those of said joints formed by said intermediate and adjacent planks to support the bottom of said gate when the gate is in the passage closing position.

References Cited in the file of this patent

UNITED STATES PATENTS

| Re. 13,622 | Linkletter | Sept. 30, 1913 |
| --- | --- | --- |
| 439,517 | Ivey et al. | Oct. 28, 1890 |
| 602,973 | Buttorff | Apr. 26, 1898 |
| 834,267 | Crowley | Oct. 30, 1906 |
| 933,665 | Rafter | Sept. 7, 1909 |
| 976,573 | Jones | Nov. 22, 1910 |
| 1,059,834 | Cheatham | Apr. 22, 1913 |
| 1,159,055 | Lowe | Nov. 2, 1915 |
| 1,194,951 | Burtis | Aug. 15, 1916 |
| 1,290,371 | Seawall | Jan. 7, 1919 |
| 1,579,288 | Edwards | Apr. 6, 1926 |
| 1,877,113 | Young | Sept. 13, 1932 |
| 1,968,743 | Christoffersen | July 31, 1934 |
| 1,999,453 | Hall | Apr. 30, 1935 |
| 2,268,480 | Hardison | Dec. 30, 1941 |
| 2,277,701 | Houston | Mar. 31, 1942 |
| 2,430,200 | Wilson | Nov. 4, 1947 |
| 2,928,251 | Waring | Mar. 15, 1960 |

FOREIGN PATENTS

| 264,468 | Great Britain | Jan. 12, 1928 |
| --- | --- | --- |
| 417,823 | Great Britain | Oct. 12, 1934 |

OTHER REFERENCES

"American Miller"; page 669; October 1, 1887.

Encyclopedia Britannica; 9th edition; page 477; of 1889.

Brief Instructions for the Design and Construction of Small Dams by Tschudy et al.; U.S. Dept. of Agriculture; Bureau of Agricultural Engr.; published March 1934; pages 20, 22, and 23.